Oct. 25, 1966   A. T. CAPE   3,281,077
MEANS FOR PREVENTING FLASHBACK IN POWDER MELTING TORCHES
Filed Sept. 9, 1965

INVENTOR.
ARTHUR T. CAPE
BY
*Isler & Ornstein*
ATTORNEYS

3,281,077
MEANS FOR PREVENTING FLASHBACK IN
POWDER MELTING TORCHES
Arthur T. Cape, Monterey, Calif., assignor to Powder
Melting Corporation, Monterey, Calif., a corporation
of California
Filed Sept. 9, 1965, Ser. No. 486,171
2 Claims. (Cl. 239—85)

This application is a continuation-in-part of my copending application, Serial No. 332,200, filed December 20, 1963, and now abandoned.

The invention relates, as indicated, to means for preventing flashback in powder melting torches, but has reference more particularly to the incorporation of such means in torches of the type described, for example, in my patent, No. 3,194,501.

In torches of the aforesaid type, powder is dropped by gravity into a torch chamber into which a combustible mixture of oxygen and fuel gas flows, and the powder is then carried by such mixture to a nozzle to provide a powder melting flame at the tip of the nozzle.

The passage of the combustible mixture through said chamber creates a partial vacuum within the chamber, but the presence of powder in the chamber causes a decrease in this partial vacuum, so that if there is any obstruction in the system, downstream of said chamber, there is a tendency for the flow of the combustible gas mixture to be reversed. As a result, the flame will tend to travel back to the chamber, where an explosion will occur, and if gas has accumulated in the hopper from which the powder flows into the chamber, a dangerous explosion may occur. This recession of the flame into the interior of the torch is commonly known as a flashback or backfire.

The present invention has as its primary object the provision of means of an extremely simple nature, which can be easily incorporated in the torch structure, and which is effective to prevent the flashback from reaching the hopper or passageway leading from the hopper to the chamber, to which reference has been made.

Other objects and advantages of my invention will be apparent during the course of the following description.

In the accompanying drawings forming a part of this specification, and in which like numerals are employed to designate like parts throughout the same, FIG. 1 is a fragmentary side elevational view of a powder melting torch embodying the invention, with portions broken away to illustrate certain features;

Figure 1:
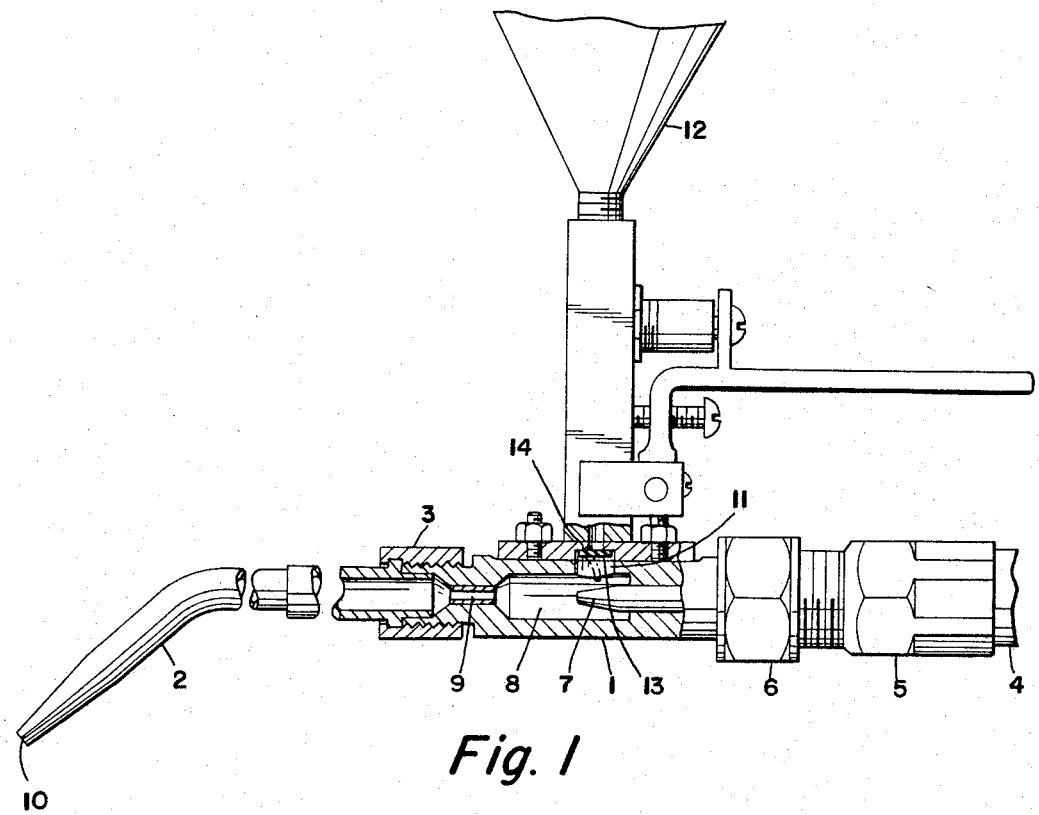

Referring more particularly to the drawings, there is disclosed a torch having a torch body 1, to the forward end of which a nozzle 2 is secured, as by a coupling nut 3. A torch butt, fragmentarily indicated by reference numeral 4 in FIG. 1, is secured to the torch body by an adapter or coupling 5 and a nut 6. The butt 4 is provided adjacent its rear end with knobs (not shown) which operate oxygen and fuel gas valves, for controlling the flow of such oxygen and fuel gas through the torch in accordance with conventional torch design.

A combustible mixture of oxygen and fuel gas is carried into the torch body by means of an injector nozzle 7, which discharges the combustible mixture into a chamber 8 in the body 1, the mixture flowing from the chamber 8, through a passageway 9 of reduced cross-section in the body 1, the mixture flowing from this passageway into the nozzle 2 to provide a powder melting flame at the tip 10 of the nozzle 2.

The body 1 is provided with an opening 11 through which powder is dropped by gravity from a hopper 12 into the chamber 8 of the torch body in a manner described in my aforesaid patent, to which reference may be had for further details.

The passage of the combustible gas mixture through the chamber 8 creates a partial vacuum in this chamber and provides an aspirator action for withdrawing powder from the chamber. The flow of powder depends partly on gravity and partly on suction of the aspirator, but the flow of powder is substantially proportional to the combustible mixture flow, because the suction of the aspirator depends upon the volume of combustible mixture discharged by the injector nozzle 7.

The presence of powder in the torch chamber 8 causes a decrease in the partial vacuum within the chamber, so that if there is any obstruction in the system downstream of the chamber 8, as, for example, an accumulation of carbon or other matter on the tip 10, there is a tendency for the direction of flow of the gas to be reversed. As a result, the combustible gas mixture accumulates in the chamber 8 and in the hopper 12, and in the passageway, including the opening 11, through which the powder drops in the chamber 8. This accumulated combustible gas mixture is ignited by the receding flame causing an explosion which can result in serious injury to the operator and/or destruction of the torch, and even when there is no explosion, a bubbling of powder in the hopper occurs, which disrupts the operation or use of the torch.

In my copending application Serial No. 486,183, I have described means located downstream of the torch chamber to which reference has been made, and which are effective to prevent flashback from occurring in or reaching said chamber.

The present invention is concerned more particularly with the provision of similar means for preventing flashback from reaching the powder hopper or the passageway through which the powder flows from the hopper into the chamber of the torch.

For this purpose, I provide, adjacent the upper end of the opening 11 in the torch body, a flap valve 13 of a material such, for example, as silicone rubber, metal foil, or the like, this valve being attached or anchored to the torch, as at 14, as by means of epoxy glue or like cement, or the flap valve may, in fact, be secured to the torch, at the point 14, as by means of a spring-biased hinge (not shown).

Figure 2:
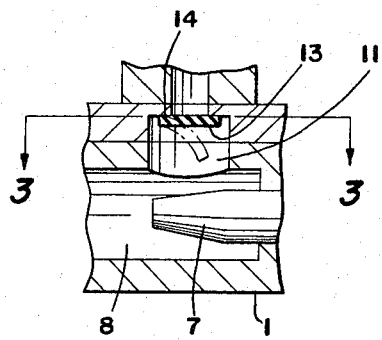
FIG. 2 is a view, on an enlarged scale, of a portion of FIG. 1.
Figure 3:
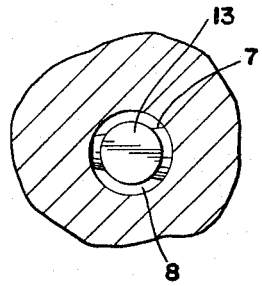
FIG. 3 is a fragmentary cross-sectional view, taken on the line 3—3 of FIG. 2.

The valve 13, in the absence of passage of the gas stream through the chamber 8, is self-closing, that is to say, it closes the powder passageway leading to the opening 11, this closed position of the valve being shown in solid lines in FIG. 2.

When the torch is in use, the suction of the gas stream in the chamber 8 is sufficient to cause the valve 13 to open, the open position of the valve being approximately indicated by the broken lines in FIG. 2, and in which position, the valve does not in any way obstruct the flow of powder into the chamber 8.

If, for the reasons already stated, the flow of gas is reversed, and is of such a nature as to create the possibility of a flashback in the powder hopper 12 or in the passageway through which the powder flows from the hopper into the chamber 8, the valve 13 will close immediately and prevent the entry of the flame into the powder hopper or said passageway.

The element 13 thus constitutes a flap valve, which is highly effective to prevent flashback in torches of the character described. The shape or contour of this valve may be varied, as will be readily understood.

It is to be understood that the form of my invention, herewith shown and described, is to be taken as a preferred example of the same, and that various changes may be made in the shape, size and arrangement of parts, without departing from the spirit of the invention or the scope of the subjoined claims.

Having thus described my invention, I claim:

1. In a powder melting torch, a torch body having a chamber therein into which a combustible gas mixture flows, said torch body having an opening for admitting powder into said chamber, a powder hopper, a passageway from said hopper to said opening in said torch body for flowing powder by gravity into said chamber, a nozzle secured to the forward end of said torch body and through which said combustible gas mixture flows from said chamber to provide a powder melting flame at the tip of the nozzle, the improvement which comprises: means for preventing flashback in said hopper and said passageway, said means comprising a valve disposed in said torch body at that end of said passageway which opens into said chamber, said valve being inherently self-closing, but openable during flow of said combustible gas mixture through said torch in a forward direction and remaining open during passage of the combustible gas mixture through said torch and being self-closable on cessation of said gas flow through said torch and closing in response to reversal of the direction of flow of the gas mixture through the torch on flashback.

2. A torch, as defined in claim 1, in which said valve is a flap valve.

References Cited by the Examiner

UNITED STATES PATENTS

| 2,311,833 | 2/1943 | Holland-Letz | 239—534 |
| 2,418,200 | 4/1947 | Smith. | |
| 3,190,560 | 6/1965 | Schilling et al. | 239—85 |
| 3,194,501 | 7/1965 | Cape | 239—85 |

EVERETT W. KIRBY, *Primary Examiner.*